US006064162A

United States Patent [19]

Bowers

[11] Patent Number: 6,064,162

[45] Date of Patent: May 16, 2000

[54] CIRCUIT FOR AUTOMATIC OPERATION OF A SERIES BRAKE UPON POWER LOSS DURING A REGENERATIVE BRAKING PERIOD

[75] Inventor: Patrick J. Bowers, Columbia, S.C.

[73] Assignee: Square D Company, Palatine, Ill.

[21] Appl. No.: 09/067,119

[22] Filed: Apr. 27, 1998

[51] Int. Cl.[7] .................................. H02P 5/06; H02P 7/12

[52] U.S. Cl. ........................... 318/246; 318/247; 318/258

[58] Field of Search ..................................... 318/360–380, 318/246, 248, 280–293

[56] References Cited

U.S. PATENT DOCUMENTS

| | | | |
|---|---|---|---|
| 3,601,670 | 8/1971 | Eriksson et al. | 318/87 |
| 3,746,954 | 7/1973 | Myles et al. | 318/247 |
| 3,748,560 | 7/1973 | Sawa et al. | 318/430 |
| 4,375,603 | 3/1983 | Konrad | 318/139 |
| 4,423,363 | 12/1983 | Clark et al. | 318/375 |
| 4,453,111 | 6/1984 | Acker | 318/111 |
| 4,551,659 | 11/1985 | Markham | 318/258 |
| 4,723,107 | 2/1988 | Schmid | 322/35 |
| 5,027,049 | 6/1991 | Pratt et al. | 318/807 |
| 5,039,924 | 8/1991 | Avitan | 318/139 |
| 5,070,283 | 12/1991 | Avitan | 318/139 |
| 5,117,166 | 5/1992 | Kumar | 318/362 |
| 5,264,763 | 11/1993 | Avitan | 318/139 |
| 5,875,281 | 2/1999 | Thexton et al. | 388/801 |

*Primary Examiner*—Paul Ip

*Attorney, Agent, or Firm*—David R. Stacey; Larry I. Golden; Larry T. Shrout

[57] ABSTRACT

An anti-regeneration circuit for preventing a regenerated current produced by an overhauling DC motor from setting a series brake. The anti-regeneration circuit includes a current blocking device 90 which blocks the flow of regenerated current in the crane control circuit 10 and a surge suppresser 94 for protecting the current blocking device 90 from a high inverse peak voltage produced by de-excitation of a crane control circuit 10 upon the sudden loss of power.

20 Claims, 5 Drawing Sheets

CIRCUIT FOR AUTOMATIC OPERATION OF A SERIES BRAKE UPON POWER LOSS DURING A REGENERATIVE BRAKING PERIOD

FIELD OF THE INVENTION

The present invention relates to crane operating circuits and in particular to an automatic anti-regeneration circuit which prevents regenerated DC current produced by an overhauling DC lifting motor during a power outage from slowing or preventing the setting of a series brake.

BACKGROUND OF THE INVENTION

Cranes have been an important part of industry for many years. Cranes driven by DC electric motors are used to hoist and move heavy loads from one location to another within the crane's service area. Since these loads can be extremely heavy, and can include molten metals in the iron and steel industries, it can easily be seen that an automatic braking system to stop the lowering of the load during a power outage is important. Two types of brakes, electrical and mechanical, are commonly used with electric motors. Electrical brakes are generally used when there is no tendency for rotation of the motor due to a heavy load. Dynamic braking is a common method of electrical braking used in DC motors. In dynamic braking, when power to motor circuit is removed, the motor will continue to rotate due to its momentum and will generate a counter electromotive force (CEMF) as long as it remains in rotation. Since the polarity of the CEMF is opposite to that of the voltage from the DC power supply, current flow in the armature will also be in the opposite direction. This reverse current flow in the motor circuit causes a torque opposite to the normal motor rotation to be developed, thus causing the motor slow. In dynamic braking, the speed at which the motor slows can be controlled by selectively changing the electrical resistance in either the field circuit, or the armature circuit of the motor. The most effective control is a combination of the two. In the field circuit, an acceleration resistor comprised of a bank of one or more resistors connected in series with the field coil are used to selectively weaken or strengthen the magnetic field through which the armature rotates. Low resistance in the field circuit produces a strong magnetic field and increases the CEMF produced while a high resistance in the field circuit weakens the magnetic field and decreases the CEMF produced. In the armature circuit, a dynamic braking resistor comprising one or more load resistors connected in the dynamic braking loop selectively controls current flow in the armature. Low resistance in the dynamic braking loop permits a high current flow in the armature and reduces the CEMF produced while a high resistance in the dynamic braking loop reduces current flow in the armature and increases the CEMF produced. The time required to bring the motor to a complete stop will depend on the resistance values of the acceleration resistor and the dynamic braking resistor in the motor circuit, the friction of the system, and the external load on the motor (weight of the load supported by a crane lifting motor). Dynamic braking is most effective in shunt or lightly compounded motors since the field is in parallel with the armature and therefore independent of armature current. During the lowering operation of a DC crane, the series wound DC motor is selectively manipulated into a shunt connected machine (motor, armature and field are connected in parallel) through the use of contacts controlled by a master switch in the crane control circuit. Configuring the motor as a shunt machine allows the motor to take advantage of dynamic braking when lowering a load. Mechanical brakes are generally spring-set brakes and are normally engaged when power to the motor is not present. When power is applied to the motor, the brake is released by means of a solenoid-operated mechanism that overcomes the force of the engagement spring. The solenoid is operated by a coil electrically connected in series with the motor, such that, when power is applied to the motor, the solenoid coil will be activated, thereby releasing the mechanical brake. When power is removed from the motor circuit, whether by normal crane operation or by a power outage, the solenoid coil is deactivated, thereby activating the spring-set mechanical brake. During normal crane operation, the master switch controls the direction and speed of the DC lifting motor by operating contacts in the motor circuit. When the master switch is moved to the OFF position, dynamic braking will quickly slow the motor to a stop. This will stop the generation of the CEMF and the flow of reverse current in the motor circuit thus deactivating the series-wound solenoid and activating the spring-set mechanical brake. However, if the crane is lowering a heavy load at some speed other than the lowest speed when power is lost, the weight of the load will cause the motor to continue rotating and thereby continue generating a CEMF. The reverse current in the motor circuit will prevent the setting of the mechanical brake by the series-wound solenoid. If the load is heavy enough to maintain the motor in an overhauling state, the dynamic brake can not slow the motor to a stop and the mechanical brake will not be set. This will result in the continued lowering of the load until it reaches the floor or other supporting means.

In an effort to overcome this problem, crane control systems have been provided with emergency stop switches and "dead man" switches in the crane operating circuitry. These switches would operate or control a contact in either the undervoltage circuit or the armature circuit, which would cause the armature circuit to be opened, thereby stopping the flow of current. The problem with these switches is that they require some action by the crane operator to initiate activation. During an emergency, this operator required action could be difficult or impossible. It is also possible for the switch operation to be defeated or rendered inoperable by the operator. This has been particularly true with respect to the "dead man" switch, which is generally a spring biased normally open switch requiring the operator to continuously hold it in the activated position while lowering the crane's load. A more recent method, as described in a paper by M. A. Urbassik entitled "Automatic Brake Setting During DCCP Regenerative Hoist Control Power Loss Condition", presented at the 1997 A.I.S.E. proceedings, employs a low voltage monitoring relay (LVMR) which monitors the DC bus voltage. The LVMR, upon sensing a change in the DC bus voltage, initiates the activation of the series brake. Although it is not disclosed how the series brake activation is initiated, it would be obvious to open a contactor in the undervoltage circuit of the crane control circuit or the motor circuit as in the "dead man" switch or E-Stop button. This particular application, as further described in the paper, requires some adjustment of the LVMR, depending on the characteristics of the particular crane system on which it is to be installed. It would therefore be desirable to have an automatic anti-regeneration circuit which can easily be connected to an existing crane control system, and which does not require any additional electrical adjustments for proper operation with the existing crane control system in which it is to be installed. It would also be desirable to have a completely electronic application of the automatic anti-regeneration circuit, thus eliminating mechanical elements such as contacts, which can have mechanical failures.

SUMMARY OF THE INVENTION

The present invention provides a simple anti-regeneration circuit which can be provided in a factory assembled crane control circuit, or which can be provided as an easily installable kit for retrofitting existing crane motor circuits. The components of each retrofit kit are selected for a particular range of NEMA motor ratings such that no additional calibration or fine-tuning of the anti-regeneration circuit is required after installation. The anti-regeneration circuit prevents DC current produced by a DC crane lifting motor incurring a power outage during a lowering operation from prohibiting the activation of a series brake. The anti-regeneration circuit includes a power diode and a surge suppresser. The power diode is electrically connected in series with the crane lowering contactor and is connected to permit normal current flow in the motor circuit and prohibit reverse current generated by the overhauling motor from energizing the crane control circuit. The surge suppresser includes a control diode and a discharge resistor, electrically connected in series with one another, and together, electrically connected in parallel with the crane control circuit. The control diode is connected such that the discharge resistor is electrically active only when the motor circuit loses power.

Figure 1:
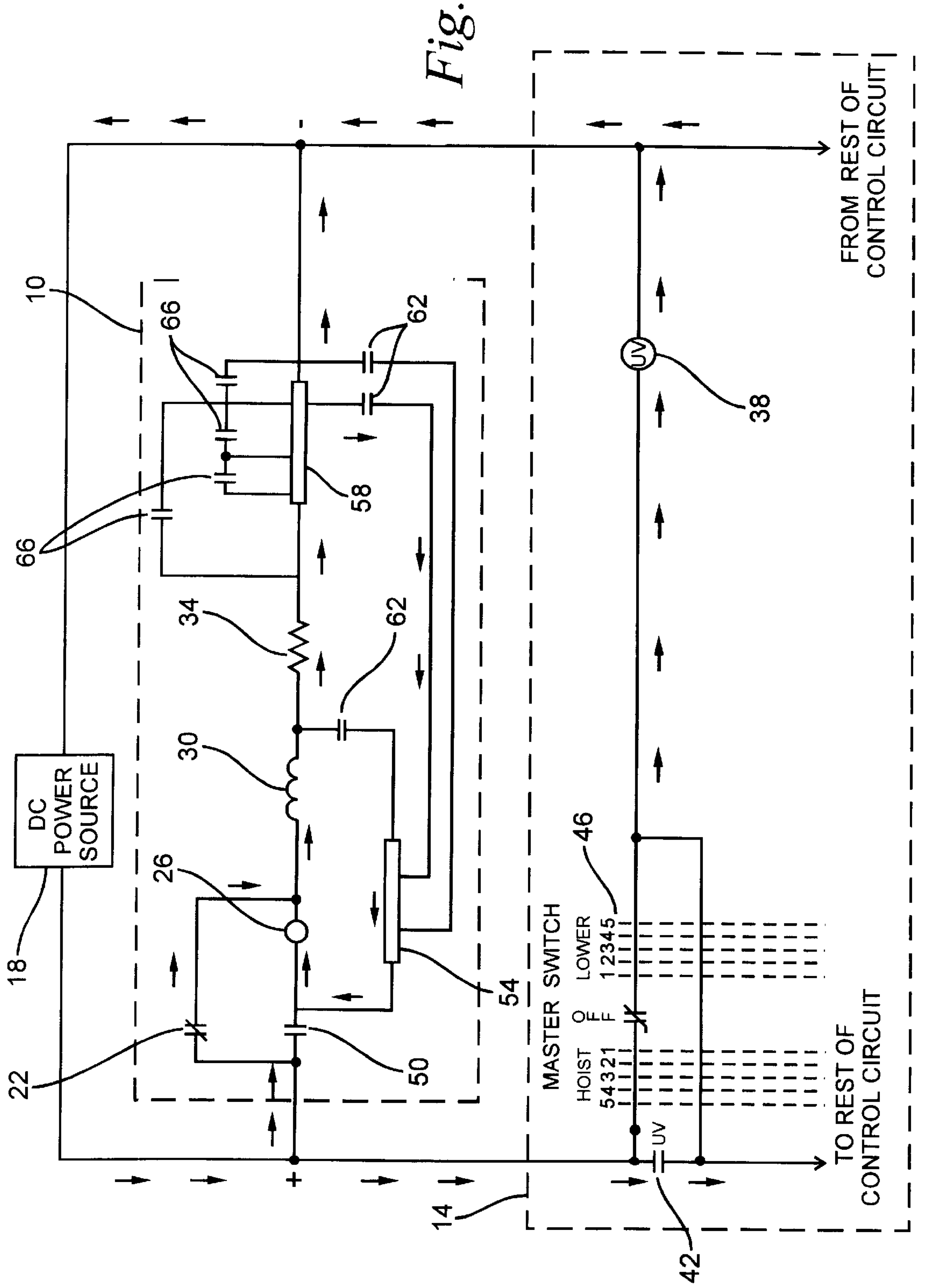
FIG. 1 is a circuit diagram of a typical crane operating circuit of the prior art configured in a normal fourth speed lowering mode with power supplied by the DC power source.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DESCRIPTION OF THE PREFERRED EMBODIMENT

FIG. 1 illustrates a crane operating circuit, generally indicated by reference numeral 12, consisting of a hoist motor circuit, generally indicated by reference numeral 10, and those elements of a crane control circuit, generally indicated by reference numeral 14, which are relevant to the following discussion of the present invention, both circuits 10 and 14 being typical of the prior art. In FIG. 1, the arrows indicate the direction of current flow during a normal load lowering operation at speed 4. During the lowering operation, the series DC motor is operating to oppose the downward pulling weight of the load and thereby permit a controlled decent of the load. A DC power source 18 provides operating power for both circuits 10 and 14. In the motor circuit 10, current passes through a lowering contact 22, a motor armature 26, a series field 30 (the motor), and a series-wound solenoid coil 34. Current flow in the series-wound solenoid coil 34 keeps a mechanical series brake from being engaged while the crane hoist motor is being operated. In the crane control circuit 14, an undervoltage (UV) relay 38 monitors the voltage level and is intended to open an undervoltage (UV) contact 42 in the event of a loss of power from the power supply 18, thereby interrupting current flow in both the control circuit 14 and the motor circuit 10. A master switch 46 in the control circuit 14 controls the lowering or hoisting state of the crane by selectively opening or closing the lowering contact 22 and hoisting contact 50 in the motor circuit 10. The master switch 46 also controls the lowering and hoisting speed by selecting resistance values for a dynamic braking resistor 54 and an acceleration resistor 58. Selectively opening and closing contacts 62 associated with the dynamic braking resistor 54 and contacts 66 associated with the acceleration resistor 58 accomplish the selection of resistance values. Since FIGS. 1–5 illustrate circuits 10 and 14 in a lowering configuration, the hoist contact 50 in the motor circuit 10 remains open.

Figure 2:
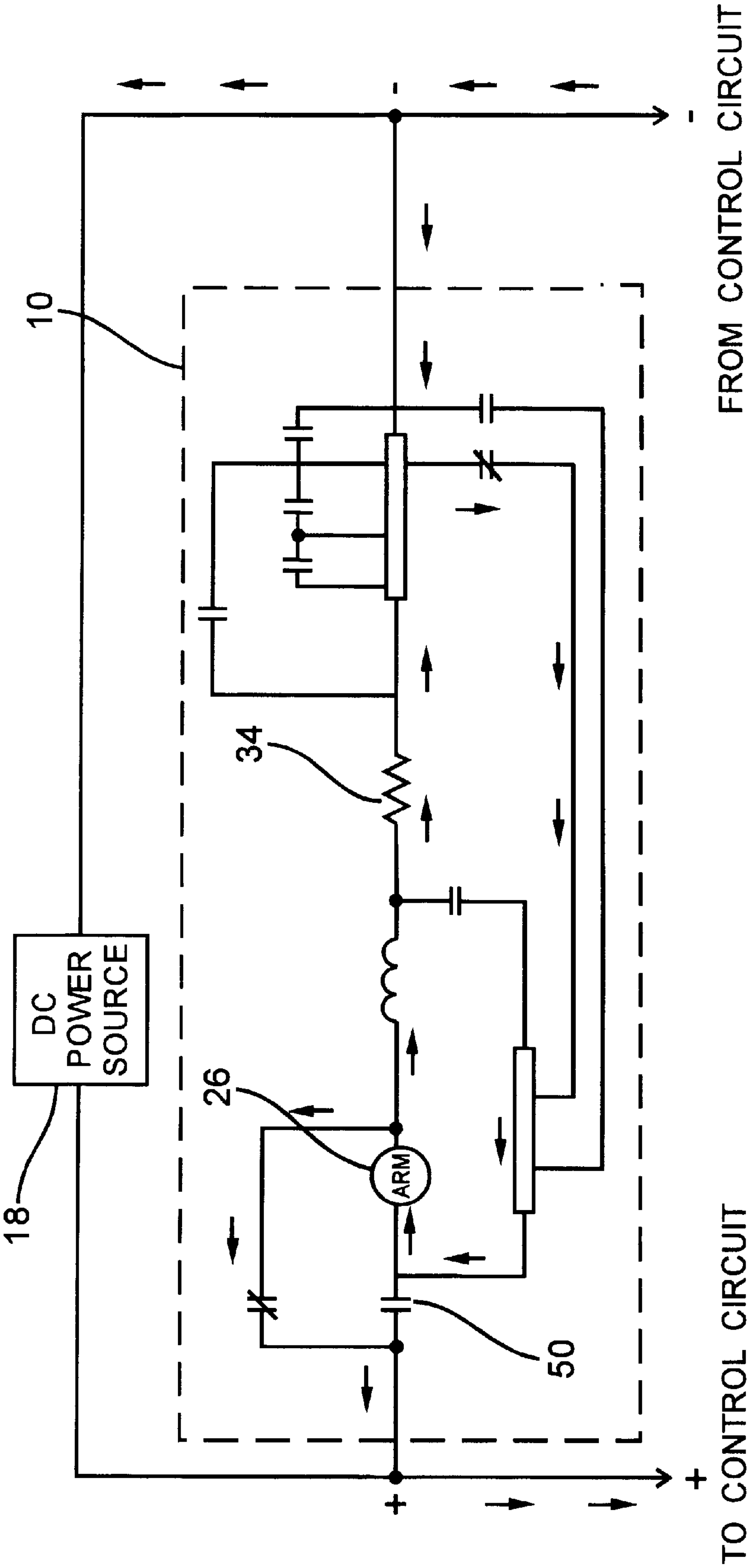
FIG. 2 is a circuit diagram of a typical crane operating circuit of the prior art configured in a normal fourth speed lowering mode with a power outage.

FIG. 2 illustrates the same motor circuit 10 as shown in FIG. 1; however, the arrows indicate the direction of reverse current flow caused by motor regeneration when a power loss occurs during the lowering of a heavy load. The downward movement of the load will cause the motor to be in an overhauling state in which it will generate sufficient current to keep the series-wound coil 34 of the solenoid energized and thus prohibit the setting of the series brake. There will also be sufficient current flowing in the control circuit 14 (FIG. 1) to keep the UV relay 34 energized, thereby maintaining the UV contact 42 in a closed state. If the weight of the load is greater than the effect of the motor's dynamic braking, the load will continue to drop at a rate controlled by dynamic braking until the CEMF is reduced to a level that will permit the UV contact 42 to open, or until the load reaches the ground. The circuits 10 and 14, as shown in FIGS. 1 and 2, have no method of preventing regenerated current from the motor circuit 10 from flowing back into the crane control circuit 14 other than the emergency stop button or "dead man" switch, which require action by the crane operator.

Figure 3:
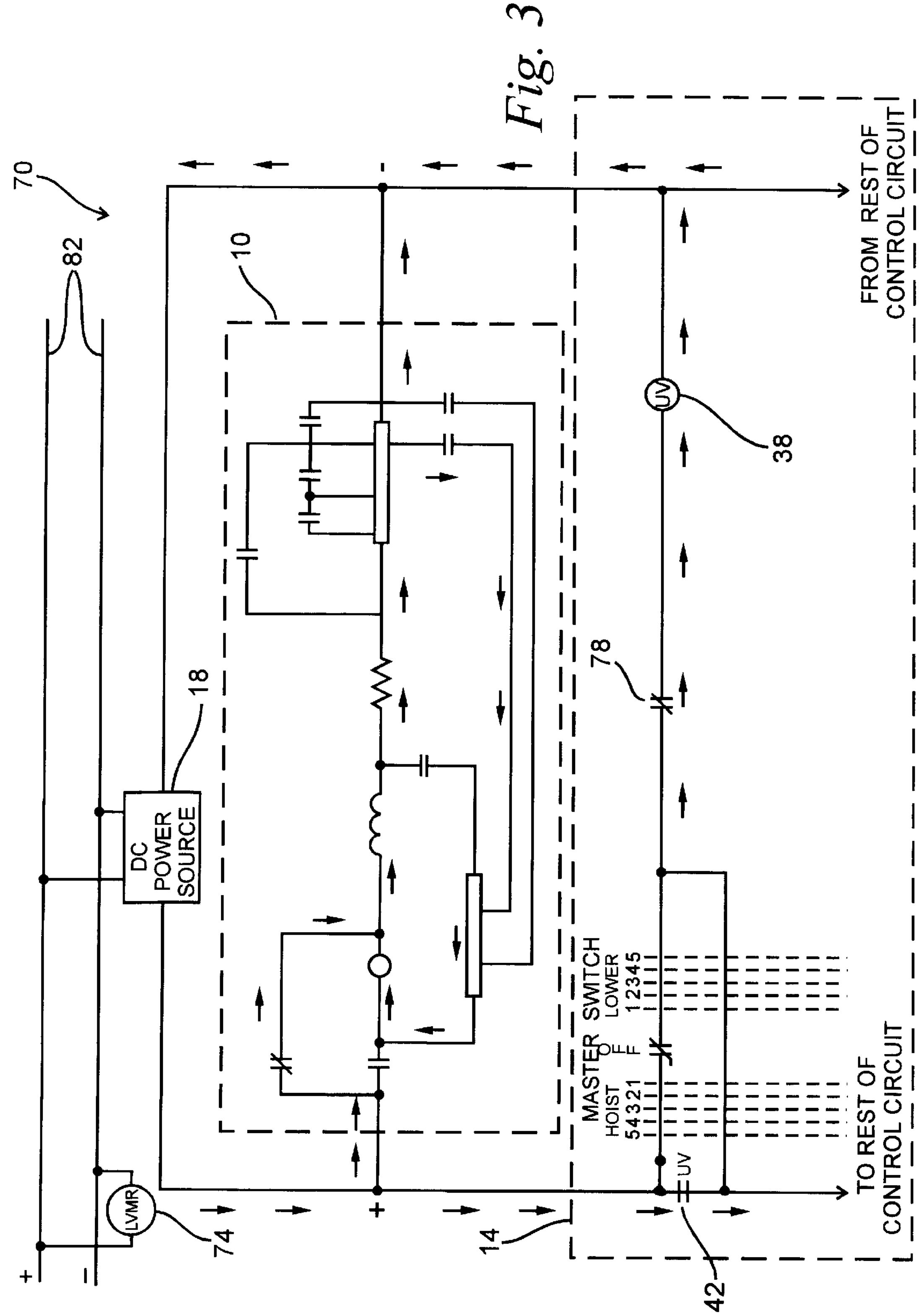
FIG. 3 is a circuit diagram of a crane operating circuit of the prior art configured in a normal fourth speed lowering mode and employing a LVMR and a contact in the crane control circuit.

FIG. 3 illustrates a crane operating circuit of the type generally described by Urbassik in the A.I.S.E. paper of 1997, and generally indicated by reference numeral 70. Operating circuit 70 employs the motor circuit 10, control circuit 14, power supply 18 as described above, and includes a low voltage monitoring relay (LVMR) 74 and a contact 78 or similar circuit opening device operated by the LVMR 74. The contact 78 is connected in series with the undervoltage relay 34 of the crane control circuit 14. The LVMR 74 monitors the voltage of a DC bus 82, which provides power to the power supply 18. If the LVMR 74 detects a change in the DC bus 82 voltage, the contact 78 is opened, causing the low voltage relay 34 to open the low voltage contact 42. The open contact 42 prevents any regenerated current from the motor circuit 10 entering the control circuit 14.

Figure 4:
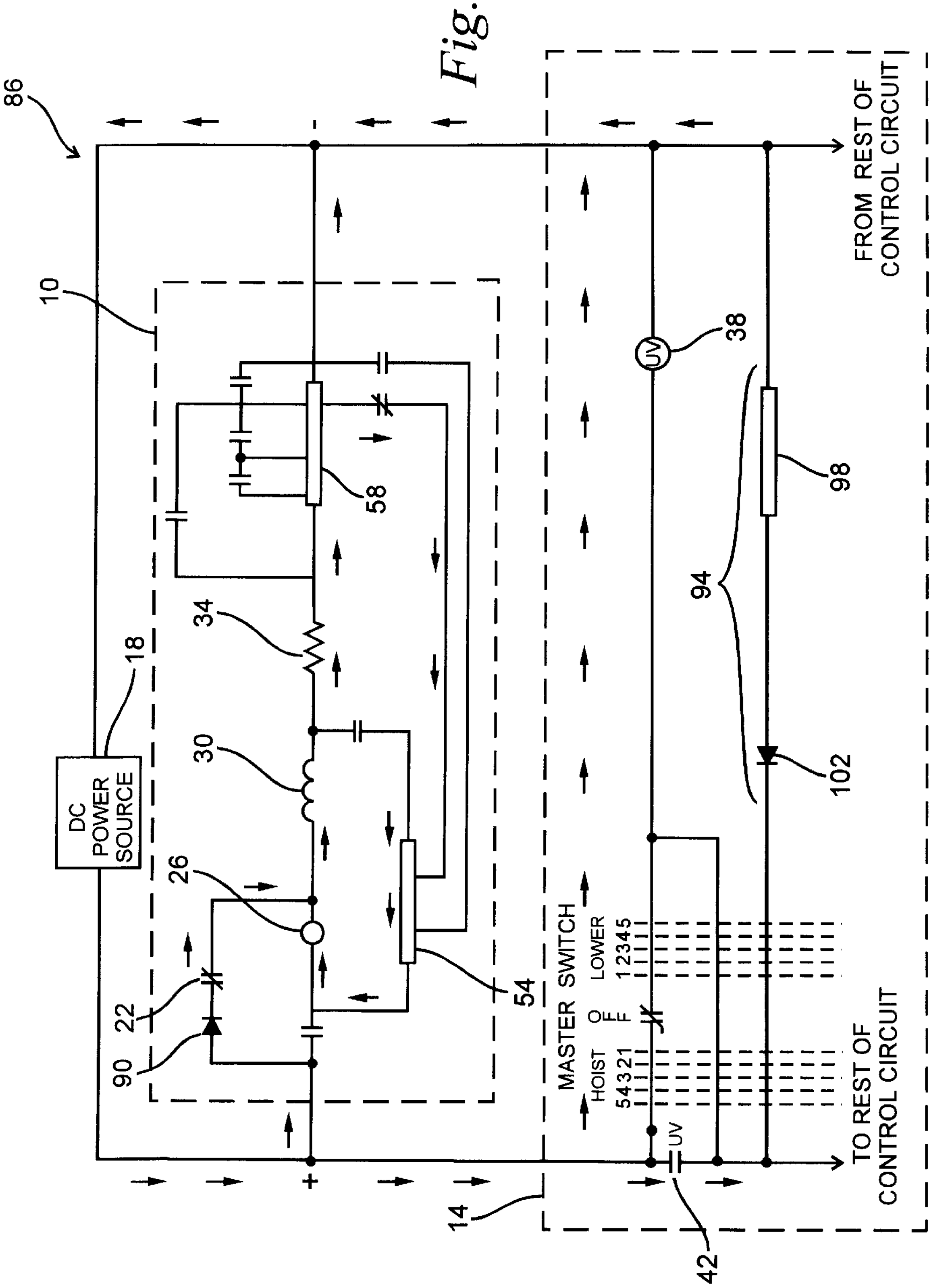
FIG. 4 is a circuit diagram of a crane operating circuit in accordance with the present invention configured in a normal fourth speed lowering mode with power supplied by the DC power source.

FIG. 4 illustrates a crane operating circuit constructed in accordance with the present invention and generally indicated by reference numeral 86. In this illustration, as in FIG. 1, the arrows indicate the direction of current flow during a normal load lowering operation. Operating circuit 86 employs the motor circuit 10, control circuit 14, power supply 18 as described above, and includes an anti-regeneration circuit comprised of a current blocking device 90 in the motor circuit 10 and a surge suppresser 94 in the control circuit 14. The orientation of the current blocking device 90 in the motor circuit 10 blocks the flow of current produced by an overhauling DC motor during a power outage, but does not block the normal flow of current from the DC power source 18 in the crane control circuit 14. In the preferred embodiment, the current blocking device 90 is a power diode connected electrically in series with the lowering contact 22 and the motor armature 26 of the motor circuit 10. The current blocking device (power diode) 90 should be rated to continuously withstand 200% of the rated motor current for the largest NEMA size motor in which the anti-regeneration circuit will be installed. During a power loss, a high inverse peak voltage is generated by the de-excitation of the control circuit 14. This high inverse peak voltage will be placed across the current blocking device 90. It is therefore important to provide a surge suppresser 94 in the control circuit 14, which will prevent the high inverse peak voltage from damaging the current blocking device 90. It is also important that the surge suppresser 94 not be actively in the control circuit 14 during normal operation, when power is being provided by the DC power source 18. Therefore, the surge suppresser 94 consists of two components, an energy dissipation device 98, which reduces the high inverse peak voltage to a level which will not damage the current blocking device 90, and a selective activation device 102, which determines when the energy dissipation device 98 will be actively in the control circuit 14. In the preferred embodiment, the energy dissipation device 98 is a dissipation resistor, and the selective activation device 102 is a control rectifier. The dissipation resistor and control rectifier are electrically connected in series with one another. The selective activation device 102 is connected in the control circuit 14 such that normal current flow from the DC power source 18 will not pass through the dissipation device 98, but current produced by the high inverse peak voltage caused by rapid de-excitation of relay coils in the control circuit 14 will pass through the dissipation device 98. The dissipation device 98 and selective activation device 102 together are connected electrically in parallel with the control circuit 14. The value of the dissipation resistor must be selected such that the current blocking device 90 will never be subjected to a peak inverse voltage greater than it is rated for. Therefore, the value of the dissipation device 98 must be selected based on the maximum inverse peak voltage that can be produced by the de-excitation of relay coils in the control circuit 14 for the largest NEMA rating for a motor in which the anti-regeneration circuit will be installed. As an example, for a NEMA size 5 or 5A control circuit 14: the blocking device 90 can be a Semikron SKN 1500/20 rectifier diode or equivalent with a heat sink such as Semikron P 11 or equivalent; the selective activation device 102 can be a Semikron SKN 20/16 or equivalent with a heat sink such as Semikron K3-M6 or equivalent; and the dissipation device 98 can be two 150 ohm Ohmite type resistors having a rating of 200 watts each, connected in series, or their equivalent. All of these components are commercially available.

Figure 5:
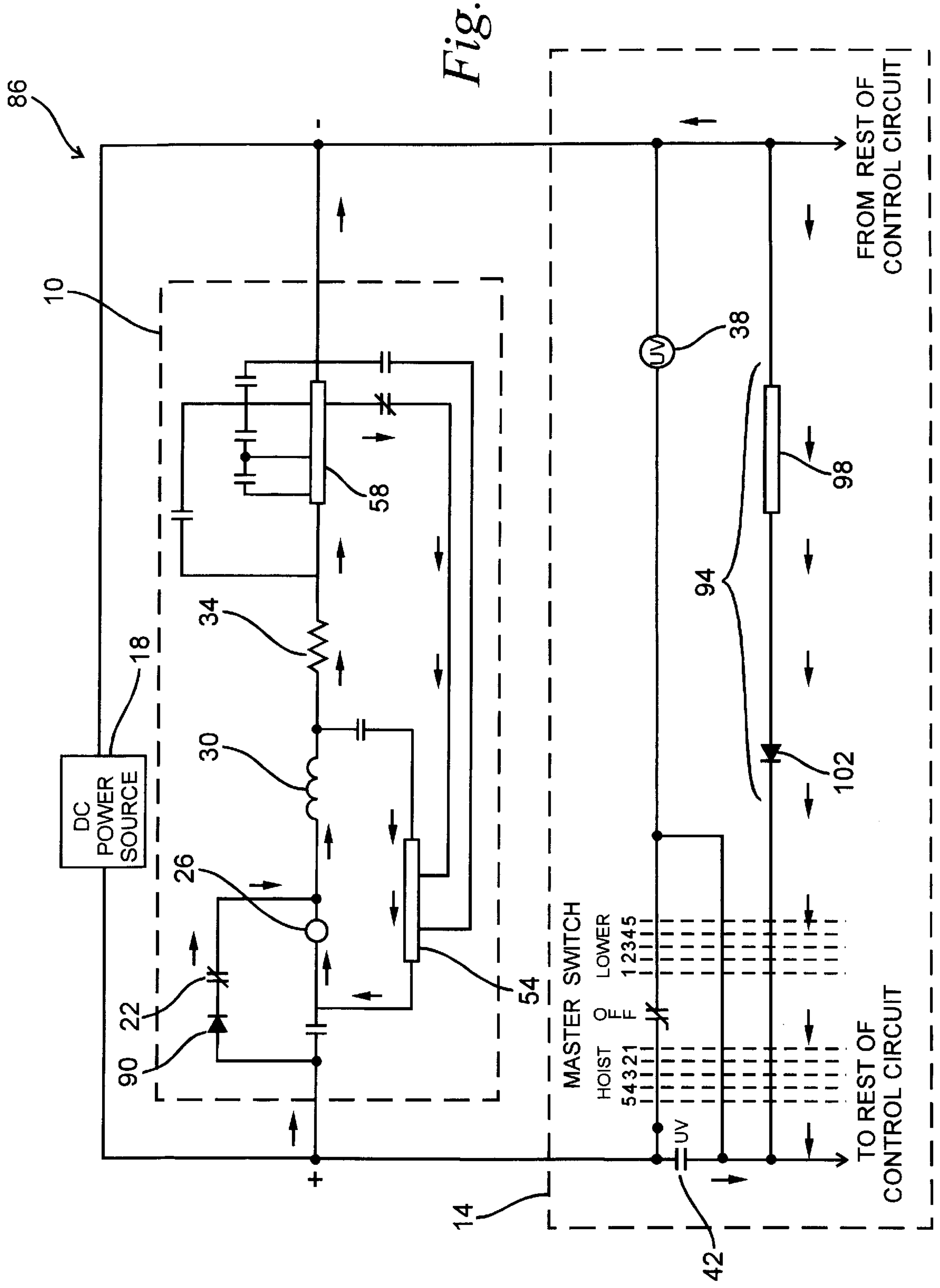
FIG. 5 is a circuit diagram illustrating current flow in a crane operating circuit assembled in accordance with the present invention configured in a normal fourth speed lowering mode with a power outage.

FIG. 5 illustrates the same crane operating circuit 86 as shown in FIG. 4, however the arrows indicate the direction of current flow caused by motor regeneration when a power loss occurs during the lowering of a heavy load. The blocking device 90 of the automatic anti-regeneration circuit prevents regenerated current produced by the DC motor during a power outage from entering the control circuit 14, but does not prevent normal crane control circuit current flow under all normal operating conditions. The anti-regeneration circuit, when installed in a crane operating circuit 86, is active at all times and does not require a monitoring relay 74 or a contact 82 to open the control circuit 14, nor does it require any action by the crane operator.

The current blocking device 90 and surge suppresser 94 of the anti-regeneration circuit of the present invention can be incorporated into a printed circuit board for retrofitting the existing motor and crane control circuits, 10 and 14, respectively, of an existing crane operating circuit 12 in the field. The retrofit is accomplished by making electrical connections between the circuit board of the existing motor and crane control circuits, 10 and 14, respectively, and the anti-regeneration circuit. The connections can be made by means of simple plug-in connectors or by connecting jumper wires between selected points of the original existing motor and crane control circuits, 10 and 14, respectively, and electrical terminals on the anti-regeneration circuit printed circuit board.

I claim:

1. An operating circuit for a crane having a DC lifting motor circuit and a control circuit, said operating circuit comprising:

a series-wound brake activating solenoid;

an anti-regeneration circuit including a current blocking device electrically in series with said series-wound brake activating solenoid and a surge suppresser electrically in parallel with said control circuit, said current blocking device preventing a regenerated DC current from flowing in said control circuit and said surge suppresser protecting said blocking device from a reverse DC voltage spike caused by a sudden loss of power in said control circuit.

2. The crane operating circuit of claim 1 wherein said blocking device is a power diode.

3. The crane operating circuit of claim 2 wherein said power diode is electrically in series with an electrical switch controlling a lowering circuit of said crane control circuit.

4. The crane operating circuit of claim 3 wherein said power diode is connected such that current flow in said crane control circuit from a DC power source providing operating power to said crane control circuit and the DC lifting motor under normal operating conditions is not blocked.

5. The crane operating circuit of claim 3 wherein said power diode is connected such that reverse current flow in said crane control circuit resulting from overhauling of the DC lifting motor is blocked.

6. The crane operating circuit of claim 1 wherein said surge suppresser comprises a selective activation device and a dissipation device electrically connected in series with one another.

7. The crane operating circuit of claim 6 wherein said selective activation device is a control rectifier and said dissipation device is a discharge resistor.

8. The crane operating circuit of claim 7 wherein said control rectifier is configured such that said discharge resistor is electrically active only when said crane control circuit does not receive power from said DC power source.

9. A crane operating circuit comprising:

a DC power source for providing power to a DC lifting motor circuit and a control circuit;

a series brake activating circuit for activating a series brake upon a sudden loss of said power provided by said DC power source;

a current blocking device for blocking a regenerated current produced by the overhauling of said DC lifting motor resulting from said sudden loss of power, said blocking device preventing the regenerated DC current from flowing in said crane control circuit and thereby maintaining said series brake activating circuit in an non-activating state;

a surge suppresser for protecting said current blocking device from a high peak reverse voltage caused by the sudden loss of power in the control circuit.

10. The crane operating circuit of claim 9 wherein said series brake activating circuit is a solenoid energized by current flow in said crane control circuit.

11. The crane operating circuit of claim 9 wherein said blocking device is a power diode.

12. The crane operating circuit of claim 11 wherein said power diode is electrically in series with an electrical switch supplying power to said crane control circuit.

13. The crane operating circuit of claim 12 wherein said power diode is connected such that normal current flow in said crane control circuit is not blocked, but reverse current flow in said crane control circuit is blocked.

14. The crane operating circuit of claim 9 wherein said surge suppresser comprises a control rectifier and discharge resistor electrically in series with one another and electrically in parallel with said crane control circuit.

15. The crane operating circuit of claim 14 wherein said control diode is configured such that said discharge resistor is electrically active only when said crane control circuit does not receive power from said DC power source.

16. An anti-regeneration circuit for retrofitting a DC crane operating circuit having a motor circuit and a control circuit, said anti-regeneration circuit comprising:

a printed circuit board having a plurality of electrical terminations, each said termination providing a connecting means to particular point of the DC crane operating circuit;

a current blocking device mounted on said printed circuit board, said current blocking device having a first end electrically connected to a first one of said plurality of electrical terminations and a second end connected to a second one of said plurality of electrical terminations; and a surge suppresser also being mounted on said printed circuit board, said surge suppresser having a first end electrically connected to a third one of said plurality of electrical terminations and a second end electrically connected to a fourth one of said plurality of electrical terminations.

17. The crane operating circuit of claim 16 wherein said blocking device is a power diode having its anode connected to said first electrical terminal and its cathode connected to said second electrical terminal.

18. The crane operating circuit of claim 17 wherein said first electrical terminals is to be connected to a positive DC connection point of said motor circuit and said second electrical terminal is to be connected to a negative DC connection point of said motor circuit such that said blocking device is connected electrically in series with a switch controlling a lowering circuit of said motor circuit.

19. The crane operating circuit of claim 16 wherein said surge suppresser comprises a selective activation device and a dissipation device electrically connected in series with one another and electrically connected in parallel with said control circuit.

20. The crane operating circuit of claim 19 wherein said selective activation device is a control rectifier and said dissipation device is a discharge resistor, the cathode of said control rectifier being connected to said third electrical terminal and the anode of said control rectifier being connected to one end of said discharge resistor, said fourth electrical terminal to be connected to the other end of said discharge resistor, said third terminal being connected to a positive DC connection point of said control circuit and said fourth electrical terminal to be connected to a negative DC connection point of said control circuit.

* * * * *